United States Patent [19]

Pianka

[11] 3,759,972
[45] Sept. 18, 1973

[54] FUNGICIDAL CARBONATES AND THIOLOCARBONATES OF DIHALODINITRO-PHENOLS

[75] Inventor: Max Pianka, St. Albans, England

[73] Assignee: The Murphy Chemical Company Limited, St. Albans, England

[22] Filed: Jan. 14, 1971

[21] Appl. No.: 106,551

Related U.S. Application Data

[63] Continuation of Ser. No. 662,910, Aug. 24, 1967, abandoned.

[30] Foreign Application Priority Data

Sept. 9, 1966  Great Britain.................. 40,426/66
Sept. 9, 1966  Great Britain.................. 40,427/66

[52] U.S. Cl........... 260/463, 260/347.5, 260/455 B, 260/476 R, 260/479 R, 260/479 S, 424/285, 424/301, 424/311, 424/313, 424/314
[51] Int. Cl... C07c 79/28, C07c 154/00, A01n 9/20
[58] Field of Search............ 260/455 B, 463, 622 R

[56] References Cited
UNITED STATES PATENTS 3,052,601  9/1962  Pyne.............................. 260/622 X
2,917,534  12/1959  Sims et al. ......................... 260/463
3,234,260  2/1966  Pianka et al. ....................... 260/463

FOREIGN PATENTS OR APPLICATIONS 941,709  11/1963  Great Britain

Primary Examiner—Lewis Gotts
Assistant Examiner—Diana G. Rivers
Attorney—Bacon & Thomas

[57] ABSTRACT

Carboxylate, carbonate and thiolocarbonate esters of dichloro- and dibromodo-nitrophenols, particularly those in which the halogen atoms are in the 2-and 5-positions and the nitro groups are in the 4- and 6-positions. The compounds have activity against fungi which are plant pathogens and they have a very low degree of mammalian toxicity.

3 Claims, No Drawings

FUNGICIDAL CARBONATES AND THIOLOCARBONATES OF DIHALODINITRO-PHENOLS

This is a continuation of application Ser. No. 662,910, filed Aug. 24, 1967, now abandoned.

This invention is concerned with fungicides. 2,5-Dichloro-4,6-dinitrophenol and related dichlorodinitrophenols have been described as having varying degrees of biological activity, particularly as lamprey larvicides and nematocides but also to a much lesser extent as fungicides (See U.S. Pats. Nos. 3,052,161 and 3,108,927). In our hands the degree of fungicidal activity of these phenols was found to be very low.

It is an object of the present invention to provide new compounds having improved fungicidal activities. It is also an object of the present invention to provide fungicides having a very low degree of mammalian toxicity as evidenced by animal tests.

The present invention provides compounds of the general formula

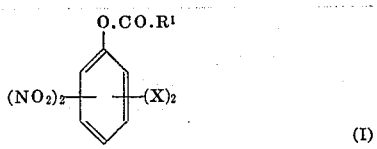

(I)

and in particular, but not exclusively, compounds of the formula:

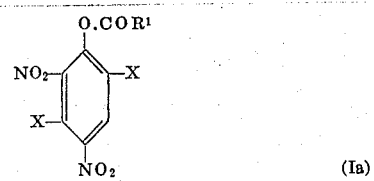

(Ia)

where $R^1$ is the group $R^2O$ or $R^2S$, $R^2$ being a substituted or unsubstituted aliphatic group or an aryl or cycloaliphatic group, or $R^1$ is the group $R^3$ where $R^3$ is a substituted or unsubstituted aliphatic, cycloaliphatic or heterocyclic group and X represents a chlorine or bromine atom.

In formula I, $R^2$ preferably represents an alkyl group or a substituted alkyl group having from 1-5 carbon atoms. The alkyl group may thus for example be a straight chain alkyl group having from one to five carbon atoms, or a branched chain alkyl group having three to five carbon atoms. Compounds where $R^2$ is a methyl group are particularly preferred. Preferred compounds includes those where $R^1$ is the group $R^2O$.

The substituent, if any, where $R^2$ is a substituted alkyl group may be a halogen (chlorine or bromine) atom or a lower alkoxy or lower alkoxy-carbonyl group. The substituent may for example be on the 1–(or α–) or on the 2–(or β–) carbon atom of the side chain $R^2$.

The group $R^2$ may further be an ethylenically unsaturated or acetylenically unsaturated group e.g., an alkenyl group or an alkynyl group preferably such a group having two or three to five carbon atoms which may be straight chained or branched. Where $R^2$ represents an aryl group it is preferably a phenyl group and where $R^2$ represents a cycloaliphatic group this is preferably a cycloalkyl group e.g., a cyclohexyl group.

Various classes of radicals for the group $R^3$ have been found to give compounds having particularly good activity. Amongst these compounds are those where $R^3$ represents (i) a lower alkyl group i.e., an alkyl group containing 1–8 carbon atoms, e.g., a methyl, ethyl or isopropyl group; (ii) a branched chain alkyl group of the formula:

$$-CH_2R^4$$

where $R^4$ represents a branched chain alkyl group having from three to six preferably three or four carbon atoms, (iii) a halogen substituted straight chain or branched alkyl group having up to 6 carbon atoms, (iv) a lower alkenyl group or a halogen substituted lower alkenyl group having up to 6 or more carbon atoms and (v) a furyl group e.g., a 2-furyl.

It has been found that the introduction of halogen (i.e., chlorine) into the group $R^3$ may result in enhancement of activity. Other substituents which may be present on the group $R^3$, in all the classes mentioned above, include lower alkoxycarbonyl and lower alkoxy groups.

The present invention also provides fungicidal compositions comprising one or more compounds according to the invention in association with a carrier. The present invention also provides a method of treating plants to protect them against attack by pests, in particular certain fungi, which comprises applying thereto an effective amount of one or more of said compounds.

The compounds according to the invention possess interesting fungicidal activity against a variety of fungal plant pathogens including apple scab-*Venturia inaequalis*, chocolate spot of broad beans-*Botrytis fabae*, broad bean rust-*Uromyces fabae*, dwarf bean rust-*Uromyces appendiculatus*, tomato leaf mould —*Cladosporium fulvum*, black currant leaf spot — *Pseudopeziza ribis*, rose black spot — *Diplocarpon rosae*, tomato grey mould — *Botrytis cinerea*, rice blast - *Pyricularia oryzae*, cucumber anthracnose —*Colletotrichum lagenarium*, rice Helminthosporium leaf spot — *Cochliobolus miyabeanus*, citrus melanose — *Diaporthe citri*, late blight of tomatoes — *Phytophthora infestans*, fusarium wilt of tomatoes — *Fusarium* oxysporum, damping off of egg plants — *Rhyzoctonia solani*, rice stem rot — *Helminthosporium sigmoideum*, citrus scab — *Elsinoe fawcetti*, rape Sclerotinia rot — *Sclerotinia sclerotiorum*, oriental picking melon mould — *Pythium aphanidermatum*, melon gummy stem blight - *Mycosphaerella melonis*, pear scab — *Venturia pirina*, Japanese pear black spot — *Alternaria kikuchiana*, rice bakanae disease — *Gibberella fujikuroi* grape rice rot — *Glomerella cingulata*, grape anthracnose — *Elsinoe ampelina*, sheath blight — *Pellicularia sasakii* and coffee berry disease - *Colletotrichum coffeanum*.

A compound of particular interest according to the present invention is 2,5-dichloro-4,6-dinitrophenyl methyl carbonate which showed high in vitro activity against a wide variety of the above organisms. The acute oral toxicity $LD_{50}$ of 2,5-dichloro-4,6-dinitrophenyl methyl carbonate is also very favourable being <3,000 mg./kg. against rats and mice.

Other important compounds according to the invention include 2,5-dichloro-4,6-dinitrophenyl 2-chloroethyl carbonate; 2,5-dichloro-4,6-dinitrophenyl 1-(ethoxycarbonyl) ethyl carbonate; 2,5-dichloro-4,6-dinitrophenyl methylthiolo carbonate; 2,5-dichloro-4,6-dinitrophenyl crotonate, 2,5-dichloro-4,6-dinitrophenyl n-hexanoate, 2,5-dichloro-4,6-dinitrophenyl acrylate, 2,5-dichloro-4,6-dinitrophenyl acetate, 2,5-dichloro-4,6-dinitro-phenyl propionate and 2,5-dichloro-4,6-dinitrophenyl 2-chloro propionate.

The fungicidal activity exhibited by compounds of the invention against rice blast — *Pyricularia oryzae* and rice Helminthosporium leaf spot — *Cochliobolus miyabeanus* is particularly important in the control of these fungal plant pathogens in rice growing areas of the world.

The compounds according to the invention can be prepared from the corresponding 4,6-dinitro-2,5-dihalophenols in any convenient manner.

The compounds of the present invention where $R^1 = R^2O$ or $R^2S$ may be prepared by reacting a compound of the general formula:

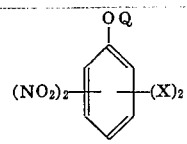

(II)

in which Q represents a hydrogen or an alkali metal atom, preferably sodium or potassium, and X has the above defined meaning, with a haloformic acid ester of the formula:

$$Z.CO.OR^2 \text{ or } S.CO.SR^2$$

III where Z is chlorine, bromine or iodine, preferably chlorine, and $R^2$ has the above defined meaning, the reaction being effected in the presence of an acid binding agent, e.g., an alkali metal carbonate, an alkali metal bicarbonate or a tertiary amine (e.g., pyridine), where Q represents a hydrogen atom.

In practice the reaction is conveniently effected in solution in an inert organic solvent e.g., a ketone such as acetone.

The phenoxide of formula (II) (where Q is an alkali metal) may be preformed, or, preferably may be formed in situ in an inert organic solvent prior to the reaction by reaction of the parent phenol (IIa) with a suitable alkali metal compound, e.g., the hydroxide, carbonate or bicarbonate.

The preparation of the compounds according to the invention by the reaction of the phenoxide of general formula (II) with a compound of general formula (III) is particularly advantageous since the use of the phenoxide in place of the parent phenol (IIa) and a tertiary base leads, in general, to a more economic process.

However, another advantageous method of preparing the compounds according to the invention comprises the simultaneous reaction of the parent phenol (IIa) with a haloformic acid ester (III) in an inert organic solvent (e.g., a ketone such as acetone) in the presence of an alkali metal carbonate or alkali metal bicarbonate, preferably an alkali metal carbonate. This process also in general gives a more economic process as compared with the use of the parent phenol (IIa) and a tertiary base. The use of alkali metal carbonates or alkali metal bicarbonates is preferred.

A preferred method for preparing the compounds of the invention where $R^1 = R^3$ comprises reacting a phenol of the general formula:-

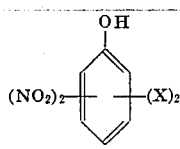

(IIa)

where X has the meaning given above, or a functional derivative of said phenol, with an acylating derivative of an acid of the general formula:

$$R^3.COOH$$

(IIIa)

where $R^3$ has any of the meanings given above.

By a functional derivative of the phenol we mean such derivatives as alkali metal phenoxides which react with reagents such as acid halides to give the same product as does the parent phenol. The acylating derivative may be an anhydride or a halide such as a chloride or bromide. Where an acid halide is used the reaction is preferably carried out in the presence of an acid-binding agent, e.g., a tertiary base such as pyridine or dimethylaniline. The reaction is conveniently effected in the presence of an inert organic solvent such as diethyl ether, benzene or tetrahydrofuran.

In practice an alkali metal (e.g., sodium or potassium) phenoxide is conveniently used as a functional derivative of the phenol and a halide of the acid is reacted with the phenoxide in solution in inert organic solvent.

The phenoxide is preferably formed by reaction of an alkali metal hydroxide or a salt of an alkali metal and a weak acid with a solution of the 4,6-dinitro-2,5-dihalo-phenol of formula (IIa) in an inert organic solvent, the latter also being a solvent for the phenoxide.

Instead of using a preformed alkali metal phenoxide the reaction may be effected by simultaneously reacting the carboxylic halide, 4,6-dinitro-2,5-dihalo-phenol and alkali metal hydroxide or salt of an alkali metal and a weak acid in an inert organic solvent in which the alkali metal phenoxide is soluble.

Suitable solvents include ketones, preferably lower alkyl ketones e.g., acetone, methyl ethyl ketone etc. The suitability of any solvent can be determined by preliminary experiment with a specimen of the alkali metal phenoxide. Sodium and potassium are preferred alkali metals.

The alkali metal compound used is preferably an alkali metal carbonate e.g. potassium carbonate or sodium carbonate.

Reaction of the carboxylic acid halide with the phenoxide or mixture of the phenol and alkali metal compound is conveniently effected at a temperature between 35° and 100°C., advantageously at the boiling point of the solvent used.

After the reaction is complete the reaction mixture is allowed to cool, precipitated alkali metal halide is filtered off and the solvent is removed under reduced pressure. Any contaminants in the resulting ester may be removed by washing e.g., with dilute alkali and water.

The esterification reaction using an alkali metal phenoxide not only enables good yields of the desired ester to be obtained but also avoids the use of tertiary organic bases, e.g. pyridine. This preferred process is thus more economic.

The parent dinitrodihalophenols:

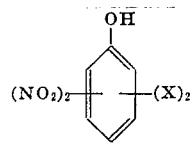

(III)

where X has the meaning given above may conveniently be prepared by dinitration of the corresponding dihalophenols.

The parent phenols need not necessarily be used in pure form and can be used as a mixture of position isomers with e.g., the 2,5-dihalo-4,6-dinitrophenol predominating.

The compounds according to the invention may be formulated for use in any desired way. Generally, such formulations will include at least one such compound in association with a suitable carrier or diluent. If desired, there may be used in addition to such compound(s) one or more further pesticides e.g. other fungicides, acaricides or insecticides. Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc., in such cases the carrier is a solvent or emulsion base which is non-phytotoxic under the conditions of use. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating compositions wherein the compound is associated with a solid pyrotechnic component.

In order that the invention may be well understood the following examples are given by way of illustration only: Preparation of carbonates from the corresponding dichloro- and dibromo phenols

EXAMPLE 1

2,5-Dichloro-4,6-dinitrophenyl methyl carbonate 2,5-Dichloro-4,6-dinitrophenol (62.0g.), potassium carbonate (17.25g.) and acetone (200ml.) were heated under reflux for 0.75 hr. Methyl chloroformate (28.0g.) was added and the mixture heated for a further 3 hr. The solid was filtered off and the filtrate distilled on a steam-bath at 14 mm. to leave a yellow solid. This was boiled with benzene (300 ml.) and filtered. The benzene was distilled off from the filtrate and the residue crystallised. 2,5-Dichloro- 4,6-dinitrophenyl methyl carbonate was obtained as a yellow solid (77.0 g.), m.p. 116° (from di-isopropyl ether). (Found: N, 9.11. $C_8H_4Cl_2N_2O_7$ requires N, 9.11percent).

Two other general methods were used to prepare the remaining compounds of the Examples, the methods being variations of the method of Example 1 and being set out below. Method 2. As for Example 1 except that the methyl chloroformate was replaced by the appropriate chloroformate. Method 3. As for method 2 except that the benzene solution of the reaction product was washed with dilute aqueous sodium carbonate until the washings were colourless. Method 4. As for method 3 except that the reaction mixture was heated under reflux for 6 hours. Method 5. As for method 2 except that the acetone was replaced by methyl ethyl ketone and the reaction mixture was heated under reflux for 16 hours. Method 6. As for method 5 except that the reaction mixture was heated under reflux for 8 hours. Method 7. As for method 5 except that the reaction mixture was heated under reflux for 6½ hours.

Other variations may be used such as allowing the reaction mixture to stand for 20 mins. before applying external heating; using a method in which the reaction mixture is heated for from 6 to 11 hours under reflux.

A series of carbonates was also prepared from 2,5-dibromo-4,6-dinitrophenol in like manner. 2,5-Dibromophenol was prepared by the method of R.V.Henley and E.E. Turner, J.C.S. 1930, 939. 2,5-dibromo-4,6-dinitrophenol was obtained as yellow prisms, m.p. 174° (decomp.) (from ethylene dichloride) using the same method as for the preparation of 2,5-dichloro- 4,6-dinitrophenol (S.S. Joshi, T.C. Mathur J.Ind. Chem. Soc. 35, 610-12).

Tables I and II give the physical characteristics of carbonates prepared and their method of preparation with reference to the Methods given above.

TABLE 1—PREPARATION AND PHYSICAL CHARACTERISTICS OF CARBONATES OF 2,5-DICHLORO-4,6-DINITROPHENOL

| Ex. No. | Name of compound | Description (solvent of crystallisation or refractive index) | Melting point (° C.) | Yield (percent) | Molecular formula | Analyses (percent) Cl Found | Analyses (percent) Cl Required | Method |
|---|---|---|---|---|---|---|---|---|
| 2 | 2,5-dichloro-4,6-dinitrophenyl ethyl carbonate. | Pale yellow prisms (methanol). | 65 | 61 | $C_9H_6Cl_2N_2O_7$ | 21.85 | 21.82 | 2 |
| 3 | 2,5-dichloro-4,6-dinitrophenyl 2-chloroethyl carbonate. | ...do... | 84 | 85.8 | $C_9H_5Cl_3N_2O_7$ | 29.59 | 29.62 | 3 |
| 4 | 2,5-dichloro-4,6-dintrophenyl 2-ethoxyethyl carbonate. | Brown oil ($n_D^{20}$ 1.5358) | | 87.8 | $C_{11}H_{10}Cl_2N_2O_8$ | 19.89 | 19.24 | 3 |
| 5 | 2,5-dichloro-4,6-dinitrophenyl 1-(ethoxycarbonyl) ethyl carbonate. | White prisms (ethanol) | 81 | 66.5 | $C_{12}H_{10}Cl_2N_2O_9$ | 18.11 | 17.88 | 3 |
| 6 | 2,5-dichloro-4,6-dinitrophenyl methylthiolo carbonate. | Pale yellow prisms (ethanol). | 95-96 | 59.3 | $C_8H_4Cl_2N_2O_6S$ | 21.7 | 21.42 | 3 |
| 7 | 2,5-dichloro-4,6-dinitrophenyl isopropyl carbonate. | White prisms (isopropyl alcohol). | 91 | 30 | $C_{10}H_8Cl_2N_2O_7$ | 21.25 | 20.94 | 4 |
| 8 | 2,5-dichloro-4,6-dinitrophenyl s-butyl carbonate. | ...do... | 52 | 23.6 | $C_{11}H_{10}Cl_2N_2O_7$ | 20.05 | 20.13 | 4 |
| 9 | 2,5-dichloro-4,6-dinitrophenyl S-ethyl thiolo carbonate. | Buff needles (2-propanol) | 81.5 | 65.6 | $C_9H_6Cl_2N_2O_6S$ | 20.00 | 20.34 | 5 |
| 10 | 2,5-dichloro-4,6-dinitrophenyl phenyl carbonate. | White needles (isopropyl ether). | 115-116 | 34.7 | $C_{13}H_6Cl_2N_2O_7$ | 19.05 | 19.03 | 5 |
| 11 | 2,5-dichloro-4,6-dinitrophenyl propargyl carbonate. | Cream needles (isopropyl ether). | 86-87 | 38.0 | $C_{10}H_4Cl_2N_2O_7$ | 20.80 | 21.19 | 5 |
| 12 | 2,5-dichloro-4,6-dinitrophenyl allyl carbonate. | Brown oil ($n_D^{20}$ 1.5531) | | 86.2 | $C_{10}H_6Cl_2N_2O_7$ | 20.65 | 21.07 | 6 |
| 13 | 2,5-dichloro-4,6-dinitrophenyl cyclohexyl carbonate. | White needles (isopropyl alcohol). | 101 | 18.7 | $C_{13}H_{12}Cl_2N_2O_7$ | 18.50 | 18.73 | 6 |
| 14 | 2,5-dichloro-4,6-dinitrophenyl n-propyl carbonate. | Pale yellow prisms (ethanol). | 48-50 | 72.3 | $C_{10}H_8Cl_2N_2O_7$ | 20.0 | 20.94 | 7 |
| 15 | 2,5-dichloro-4,6-dinitrophenyl n-butyl carbonate. | Pale yellow needles (ethanol). | 36-38 | 71.4 | $C_{11}H_{10}Cl_2N_2O_7$ | 19.95 | 20.11 | 7 |
| 16 | 2,5-dichloro-4,6-dinitrophenyl isobutyl carbonate. | Brown oil ($n_D^{20}$ 1.5308) | | 73.6 | $C_{11}H_{10}Cl_2N_2O_7$ | 19.82 | 20.11 | 6 |

TABLE II.—PREPARATION AND PHYSICAL CHARACTERISTICS OF CARBONATES OF 2,5-DIBROMO-4,6-DINITROPHENOL

| Ex. No. | Name of compound | Description (solvent of crystallisation) | Melting point (° C.) | Molecular formula | Analyses (percent Br) Found | Analyses (percent Br) Required | Method |
|---|---|---|---|---|---|---|---|
| 17 | Methyl 2,5-dibromo-4,6-dinitrophenyl carbonate | Cream needles (isopropyl ether) | 104 | $C_8H_4Br_2N_2O_7$ | 40.2 | 40.0 | 5 |
| 18 | 2-chloroethyl 2,5-dibromo-4,6-dinitrophenyl carbonate | Pale green prisms (isopropyl ether) | 72–73 | $C_9H_5Br_2ClN_2O_7$ | N, 6.5 | N, 6.2 | 3 |
| 19 | S-methyl 2,5-dibromo-4,6-dinitrophenyl thiolocarbonate | Yellow plates (methanol) | 111–112.5 | $C_8H_4Br_2N_2O_6S$ | Br, 38.8 | Br, 38.4 | 4 |
| 20 | Propargyl 2,5-dibromo-4,6-dinitrophenyl carbonate | Yellow prisms (methanol) | 103–104 | $C_{10}H_4Br_2N_2O_7$ | 38.2 | 37.7 | 4 |
| 21 | Phenyl 2,5-dibromo-4,6-dinitrophenyl carbonate | Yellow needles (methanol) | 113–114.5 | $C_{13}H_6Br_2N_2O_7$ | 34.8 | 34.6 | 4 |

Preparation of Esters ($R^1 = R^3$)

The esters were prepared from 2,5-dichloro-4,6-dinitrophenol and 2,5-dibromo-4,6-dinitrophenyl using the general methods set out below. By way of example only Method 1a is set out in detail in relation to the preparation of 2,5- dichloro-4,6-dinitrophenyl acrylate.

Method 1a

Preparation of 2,5-dichloro-4,6-dinitrophenyl acrylate 2,5-Dichloro-4,6-dinitrophenol (680g.) potassium carbonate (195g.) and acetone (3500 ml.) were heated under reflux for 1 hr. The solution was then cooled with ice-water and acrylyl chloride (267 g.) was added slowly keeping the reaction mixture at 8°– 10°. After the addition the reaction mixture was stirred for 1 hr. at 8—10° and allowed to stand at room temperature for 12 hours. The solid was then filtered off and the filtrate distilled on a steam bath at 14 mm. to leave an oil which solidified by cooling. The residue was crystallised from ethanol. 2,5-Dichloro-4,6-dinitrophenyl acrylate was obtained as pale yellow robust needles (605 g.), m.pt. 57°–58°C (yield 73percent). (Found N 8.68% $C_9H_4Cl_2N_2O_6$ requires N, 9.12percent).

Method 2a

Preparation of 2,5-dichloro-4,6-dinitrophenyl crotonate 2,5-Dichloro-4,6-dinitrophenol (6.3 g.), potassium carbonate (2 g.) and acetone (25ml.) were heated for three-quarter hr. on a water bath. Crotonyl chloride (2.9 g.) was added and the mixture refluxed for a further 3 hours. The solid was filtered off and the solvent distilled off from the reaction mixture at 14 mm. pressure. The residue was dissolved in benzene and the benzene solution washed with dilute aqueous sodium carbonate until the washings were colourless. The benzene was then distilled off under reduced pressure and the residue was recrystallised from methanol. 2,5-Dichloro-4,6- dinitrophenyl crotonate was obtained as off-white prisms (5.4g.; 66.7% yield), m.pt. 82°–82.5° (Found: Cl, 21.36.; $C_{10}H_6Cl_2N_2O_6$ requires Cl, 22.12percent). Method 3a The general procedure of Method 2a was employed except that the reaction mixture was allowed to stand for 20 minutes before applying external heating. Method 4a 2,5-Dichloro-4,6-dinitrophenol (3g.), and n- butyryl chloride (1.4g.) were heated together for 21 hours at 170°–185°C; hydrogen chloride was evolved. The reaction mixture was dissolved in benzene and washed with two portions of dilute aqueous sodium carbonate, then with water and dried over sodium sulphate. The sodium sulphate was filtered off and the filtrate was distilled on a steam-bath at 14 mm. pressure to leave crude 2,5-dichloro-4,6-dinitrophenyl n-butyrate, which on recrystallisation from ethanol yielded yellow needles (2.2 g. 56.75percent), m.p. 42°–43°C (Found: Cl, 21.85, $C_{10}H_8Cl_2N_2O_6$ requires Cl, 21.99percent). Method 5a The general procedure of Method 3a was employed except that the mixture of the phenol, potassium carbonate and acetone was heated under reflux for 10 min. After the addition of the acid chloride (propionyl chloride), the reaction mixture was heated under reflux for 0.75 hour. Method 6a The general procedure of Method 5a was employed except that the reaction mixture was heated under reflux for 5 hours. Method 7a The general procedure of Method 5a was employed except that the reaction mixture was heated under reflux for only 10 minutes. Method 8a The general procedure of Method 2a was employed except that the acid chloride was added to the solution of the potassium salt of the phenol cooled in ice/water and the mixture then stirred for 1 hour with cooling and for a further 4 hours under reflux. Method 9a The general procedure of Method 2a was employed except that the acid chloride was added at room temperature and the reaction mixture was heated under reflux for 14 hours.

A series of esters were also prepared from 2,5-dibromo- 4,6-dinitrophenol in like manner.

Tables III and IV give the physical characteristics of the esters prepared and their method of preparation with reference to the Methods given above.

TABLE III.—PREPARATION AND PHYSICAL CHARACTERISTICS OF ESTERS OF 2,5-DICHLORO-4,6-DINITROPHENOL

| Ex. No. | Name of compound | Description (solvent of crystallisation or refractive index) | Melting point (° C.) | Yield (percent) | Molecular formula | Analyses (percent) Cl Found | Analyses (percent) Cl Required | Method |
|---|---|---|---|---|---|---|---|---|
| 22 | 2,5-dichloro-4,6-dinitrophenyl acrylate | Pale yellow robust needles (ethanol) | 57–58 | 73 | $C_9H_4Cl_2N_2O_6$ | 18.68 | 19.12 | 1a |
| 23 | 2,5-dichloro-4,6-dinitrophenyl propionate | Pale yellow prisms (ethanol) | 54–56 | 64.7 | $C_9H_6Cl_2N_2O_6$ | 22.6 | 22.98 | 5a |
| 24 | 2,5-dichloro-4,6-dinitrophenyl β-methylvalerate | White prisms (light petroleum) | 43.5–44.5 | 71.3 | $C_{12}H_{12}Cl_2N_2O_6$ | 19.9 | 20.23 | 8a |
| 25 | 2,5-dichloro-4,6-dinitrophenyl α-methylvalerate | do. | 34.5–35.3 | 71.3 | $C_{12}H_{12}Cl_2N_2O_6$ | 20.50 | 20.23 | 8a |
| 26 | 2,5-dichloro-4,6-dinitrophenyl isobutyrate | Pale brown oil ($n_D^{20}$, 1.5415) | | 83.6 | $C_{10}H_8Cl_2N_2O_6$ | 21.88 | 21.99 | 3a |
| 27 | 2,5-dichloro-4,6-dinitrophenyl isovalerate | White prisms (methanol) | 50.0–50.5 | 69.2 | $C_{11}H_{10}Cl_2N_2O_6$ | 20.75 | 21.07 | 8a |
| 28 | 2,5-dichloro-4,6-dinitrophenyl 2-chloropropionate | White plates (ethanol) | 92 | 39.4 | $C_9H_5Cl_3N_2O_6$ | 30.85 | 31.0 | 7a |
| 29 | 2,5-dichloro-4,6-dinitrophenyl 3-chloropropionate | Pale yellow needles (ethanol) | 91 | 59.4 | $C_9H_5Cl_3N_2O_6$ | 30.70 | 31.0 | 7a |
| 30 | 2,5-dichloro-4,6-dinitrophenyl acetate | Pale yellow massive needles (methanol) | 95–96 | 74.6 | $C_8H_4Cl_2N_2O_6$ | 24.38 | 24.07 | 3a |
| 31 | 2,5-dichloro-4,6-dinitrophenyl α-methacrylate | Yellow needles (ethanol) | 88–89 | 80.5 | $C_{10}H_6Cl_2N_2O_6$ | 22.0 | 22.12 | 6a |

Table III—Continued
PREPARATION AND PHYSICAL CHARACTERISTICS OF ESTERS OF 2,5-DICHLORO-4,6-DINITROPHENOL

| Ex. No. | Name of compound | Description (solvent of crystallisation or refractive index) | Melting point (° C.) | Yield (percent) | Molecular formula | Analyses (percent) Cl Found | Required | Method |
|---|---|---|---|---|---|---|---|---|
| 32 | 2,5-dichloro-4,6-dinitrophenyl crotonate. | Off-white prisms (methanol). | 81–83 | 66.7 | $C_{10}H_6Cl_2N_2O_6$ | 22.87 | 22.12 | 2a |
| 33 | 2,5-dichloro-4,6-dinitrophenyl 3-methyl crotonate. | Pale brown prisms (isopropyl alcohol). | 113–114 | | $C_{11}H_8Cl_2N_2O_6$ | 20.75 | 21.19 | 2a |
| 34 | 2,5-dichloro-4,6-dinitrophenyl 2-furoate. | White needles (isopropyl alcohol). | 129–130 | 74.9 | $C_{11}H_4Cl_2N_2O_7$ | 20.30 | 20.46 | 9a |
| 35 | n-butyl 2,5-dichloro-4,6-dinitrophenyl fumarate. | White prisms (methanol). | 55–56 | 30.2 | $C_{14}H_{12}Cl_2N_2O_8$ | | 17.4[1] | 8a |
| 36 | n-pentyl 2,5-dichloro-4,6-dinitrophenyl fumarate. | ....do.............. | 55–59.5 | 33.0 | $C_{15}H_{14}Cl_2N_2O_8$ | | 16.9[1] | 8a |
| 37 | 2,5-dichloro-4,6-dinitrophenyl n-valerate. | Red Oil ($n_D^{20}$, 1.5378) | | 66.8 | $C_{11}H_{10}Cl_2N_2O_6$ | 21.1 | 21.1 | 8a |
| 38 | 2,5-dichloro-4,6-dinitrophenyl n-hexanoate. | Red oil ($n_D^{20}$, 1.5336) | | 62.7 | $C_{12}H_{12}Cl_2N_2O_6$ | 20.0 | 20.2 | 8a |
| 39 | 2,5-dichloro-4,6-dinitrophenyl n-heptanoate. | Red oil ($n_D^{20}$, 1.5290) | | 60.3 | $C_{12}H_{14}Cl_2N_2O_6$ | 19.6 | 19.4 | 8a |
| 40 | 2,5-dichloro-4,6-dinitrophenyl chloroacetate. | Cream needles [light petroleum (B.P. 80–100°)]. | 89–90 | 29.0 | $C_8H_3Cl_3N_2O_6$ | 32.3 | 32.3 | 2a |
| 41 | 2,5-dichloro-4,6-dinitrophenyl α-methylbutyrate. | White prisms [light petroleum (B.P. 40–60°)]. | 39.5–40 | 53 | $C_{11}H_{10}Cl_2N_2O_6$ | 21.3 | 21.1 | 8a |

[1] Nitrogen.

TABLE IV.—PREPARATION AND PHYSICAL CHARACTERISTICS OF ESTERS OF 2,5-DIBROMO-4,6-DINITROPHENOL

| Ex. No. | Name of compound | Description (solvent of crystallisation) | Melting point (° C.) | Molecular formula | Analyses, Cl (percent) Found | Required | Method |
|---|---|---|---|---|---|---|---|
| 42 | 2,5-dibromo-4,6-dinitrophenyl acetate | Fawn needles (methanol) | 112–113.5 | $C_8H_4Br_2N_2O_6$ | 41.1 | 41.6 | 8a |
| 43 | 2,5-dibromo-4,6-dinitrophenyl crotonate | White prisms (methanol) | 103.5–105 | $C_{10}H_6Br_2N_2O_6$ | 39.3 | 39.0 | 8a |
| 44 | 2,5-dibromo-4,6-dinitrophenyl 3-chloropropionate. | White needles (methanol) | 115–116.5 | $C_9H_5Br_2ClN_2O_6$ | 36.4 | 47.0 | 8a |

Fungicidal compositions

The products in the examples may be formulated as a 25 percent wettable powder by mixing 25 g. of the active compound, 2 g. of sodium dodecyl benzene sulphonate (wetting agent), 6 g. of calcium lignin sulphate and 67 g. of finely divided china clay and then micronising. Other compositions may be prepared as described above.

I claim

1. A compound of the formula

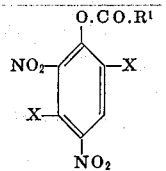

wherein:

$R^1$ is $R^2O$ or $R^2S$, $R^2$ being an unsubstituted alkyl group of one to five carbon atoms, an alkyl group of one to five carbon atoms substituted by a halo, lower alkoxy or lower alkoxycarbonyl group, an alkenyl group of two to five carbon atoms, an alkynyl group of two to five carbon atoms, a phenyl group, or a cyclohexyl group; and X represents a chlorine or bromine atom.

2. A compound selected from the group consisting of 2,5-dichloro-4,6-dinitrophenyl methyl carbonate, 2,5-dichloro- -dinitrophenyl 2-chloroethyl carbonate, 2,5-dichloro-4,6- dinitrophenyl 1-(ethoxycarbonyl)-ethyl carbonate, and 2,5- dichloro-4,6-dinitrophenyl methylthiolo carbonate.

3. 2.5 - Dichloro - 4,6 - dinitrophenyl methyl carbonate.

* * * * *